United States Patent [19]

Roach

[11] Patent Number: 5,117,781
[45] Date of Patent: Jun. 2, 1992

[54] CAT LITTER DISPOSABLE BOX CONTAINER

[76] Inventor: Daniel T. Roach, 311 Jackson #1, East Dundee, Ill. 60118

[21] Appl. No.: 688,895

[22] Filed: Apr. 22, 1991

[51] Int. Cl.[5] .............................................. A01K 67/00
[52] U.S. Cl. ..................................................... 119/168
[58] Field of Search ............... 119/161, 165, 166, 167, 119/168; 229/103

[56] References Cited

U.S. PATENT DOCUMENTS

| | | | |
|---|---|---|---|
| 3,581,977 | 6/1971 | Kirsky | 119/168 X |
| 4,164,314 | 8/1979 | Edgar | 119/165 X |
| 4,788,935 | 12/1988 | Balla et al. | 119/168 |
| 4,884,527 | 12/1989 | Skirvin | 119/168 |
| 5,014,649 | 5/1991 | Taft | 119/168 |

FOREIGN PATENT DOCUMENTS

2618050  1/1989  France ........................ 119/168

*Primary Examiner*—Gene Mancene
*Assistant Examiner*—Thomas Price

[57] ABSTRACT

A rectangular box container utilized for the deposition, temporary storage and disposal of pet cat excrement. The box container is pre-loaded with absorbent granular litter material and prior to use is shipped and stored in a compact rectangular state, approximately thirteen (13) inches wide, twenty one (21) inches long and three (3) inches tall. To use, the box unfolds to erect a larger rectangular box chamber, approximately thirteen (13) inches wide, twenty one (21) inches long and thirteen (13) inches tall. The rectangular box chamber, in its erected state, provides an opening through which a cat may enter the box to gain access to the pre-loaded absorbent granular litter material inside the box and, after use, exit the box. The container may be used in this erected state to its useful capacity, after which the container is folded down for compact disposal.

3 Claims, 4 Drawing Sheets 5,117,781

CAT LITTER DISPOSABLE BOX CONTAINER

SUMMARY OF THE INVENTION

The invention is a rectangular box container, which is a package containing absorbent granular litter material which is utilized for the deposition, temporary storage and disposal of pet cat excrement. The box container is pre-loaded with absorbent granular litter material and prior to use is shipped and stored in a compact rectangular state, approximately thirteen (13) inches wide, twenty one (21) inches long and three (3) inches tall. To use, the box unfolds to erect a permanent, stable, larger rectangular box chamber, approximately thirteen (13) inches wide, twenty one (21) inches long and thirteen (13) inches tall. The rectangular box chamber, in its erected state, provides an opening through which a cat may enter the box, to gain access to the pre-loaded absorbent granular litter material inside the box and, after use, exit the box. The container may be used in this erected state to its useful capacity, after which the container is folded down for compact disposal.

The container is comprised of three components, which fit together and work as a single unit. The three components are: a shallow rectangular inner tray, a convertible rectangular outer box and a flat rectangular diaphragm piece. Each of the three components is made from integral sheets of precut paperboard which are wax treated or otherwise treated to resist liquid leakage from inside the container. The shallow inner tray, pre-loaded with absorbent granular litter material, is contained tightly inside the bottom of the outer box. While the inner tray remains stationary inside the bottom of the outer box, the upper portion of the outer box converts by folding to achieve two (2) functional states.

The first functional state is the pre-use/post-use state. The pre-use storage configuration and the post use disposal configuration are the same physical state of the disposable box container. This state is achieved when the outer box is folded down in a compact rectangular form substantially the same size as the inner tray contained inside the outer box. The second functional state is the erected for use state. This state is achieved when the outer box is unfolded up, creating an empty, rectangular volume, over the inner tray inside the outer box. In this state, an opening in the front of the outer box is positioned, as a result of the conversion from the pre-use state to the erected for use state, through which an animal may gain access to the volume inside the disposable box container. The conversion of the container from the pre-use/post-use state, to the erected for use state, is achieved by utilizing a unique folding pattern in the outer box together with a rectangular diaphragm piece, which works in concert with the outer box to structurally maintain the container in the erected for use state.

The diaphragm is an independent, free moving, flat, rectangular, sheet paperboard piece, which is contained inside the outer box and occupies two (2) functional positions, corresponding with the two (2), functional states of the disposable box container. First, over the open top of the inner tray when the outer box is folded down to substantially the same size as the inner tray, the pre-use/post-use state, where it acts to contain the litter inside the tray. Second, engaged at the inside top of the outer box, where it acts to structurally maintain the outer box in its erected for use state, creating the larger rectangular volume above the inner tray.

To erect the larger box chamber, the outer box is unfolded up from its compact state. Reaching through an opening in the top of the outer box, the diaphragm is lifted up by its integral handle, from its position over the open top of the inner tray, and is then raised to a position at the inside top of the outer box where it is locked into position by engaging tabs along two sides of the diaphragm into the opening in the top of the outer box. Thus, it closes the opening in the top of the outer box, and exposing the absorbent granular litter material for use inside the outer box. When erected, a circular opening in the front face of the outer box is exposed, through which a cat may enter and exit. After use the diaphragm is disengaged from its supporting position and pushed back down, returning the diaphragm to its original location covering the open top of the inner tray and the litter, permitting the outer box to be folded down for compact disposal.

DESCRIPTION OF THE INVENTION

FIG. 1

Figure 1:
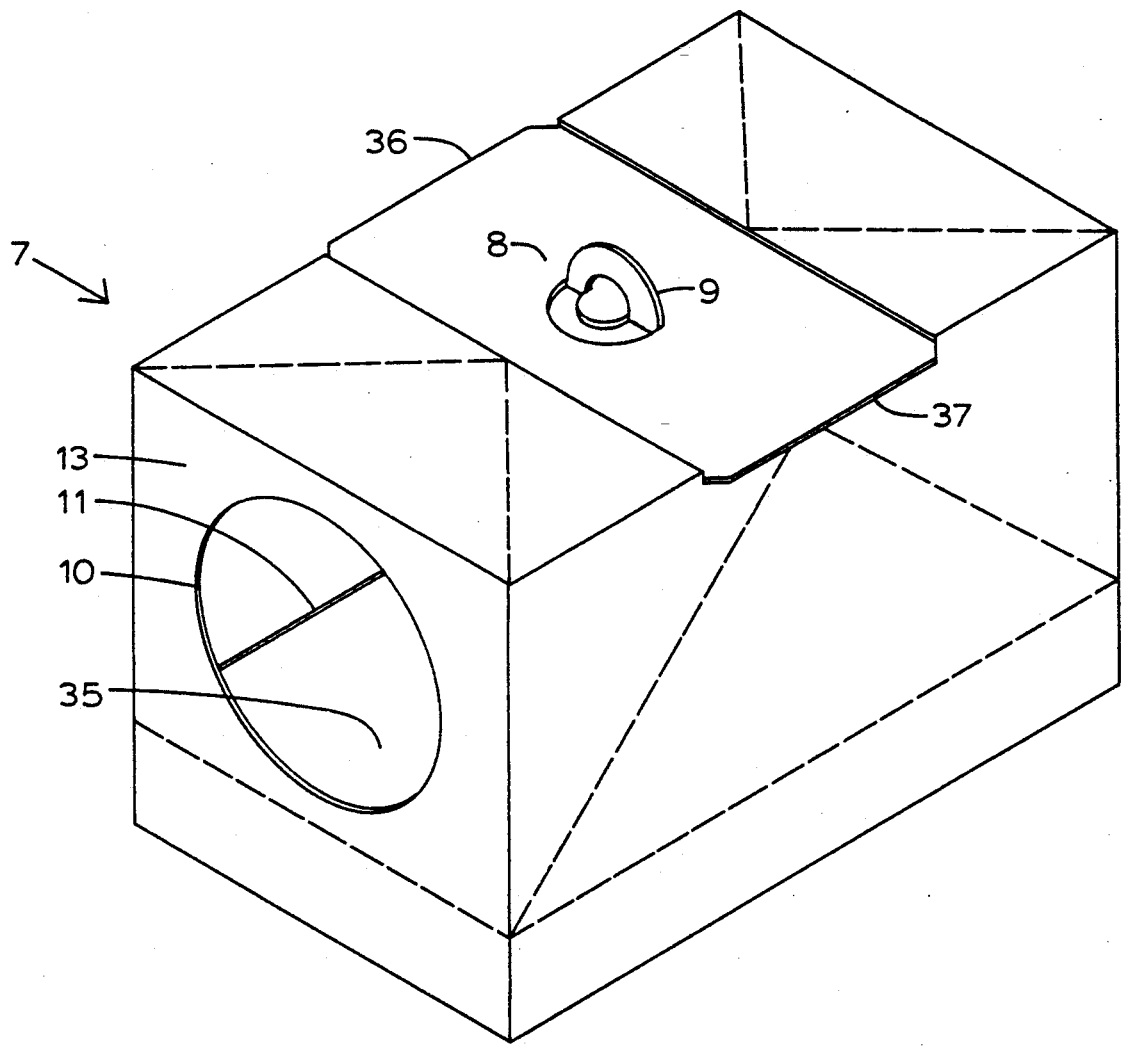
FIG. 1 is a perspective view of the invention in its erected for use state.

The preferred embodiment depicted in the drawings shows that the outer box 7, when erected as shown in FIG. 1, provides a six sided box which defines an interior volume of space and contains within it a shallow rectangular tray 11, partially filled with absorbent litter material 35, a flat stiff sheet paperboard diaphragm 8, engaged at the top of the outer box as shown in FIG. 1. The outer box 7, is maintained in the erected for use state shown in FIG. 1, by the rectangular sheet paperboard diaphragm 8, which works in concert with unique scored fold lines in the outer box, shown as dashed lines in FIG. 1, which when accessed through rectangular opening 27, in top 26, of outer box 7, is pulled up into position, as shown in FIG. 1, by tab handle 9, so that tab 36 and tab 37 of the diaphragm 8, are pulled through and engaged into opening 27, in the top 26, of the outer box 7, it thus holds the collapsible outer box 7, up and creates a permanent, stable container which defines an empty rectangular volume above the integral litter tray 11. The front side 13, of the outer box 7, has a circular opening 10, through which a cat may enter into the rectangular volume of the outer box 7, when in the erected state as shown in FIG. 1. The inner tray 11, fits tightly inside the bottom of the outer box 7, and is adhesively fastened in place. The outer box 7, the diaphragm 8, and the inner tray 11, can be easily manufactured using conventional cardboard packing box techniques, common to the art. The materials used would be wax treated or otherwise treated to resist liquid leakage.

FIG. 2

Figure 2:
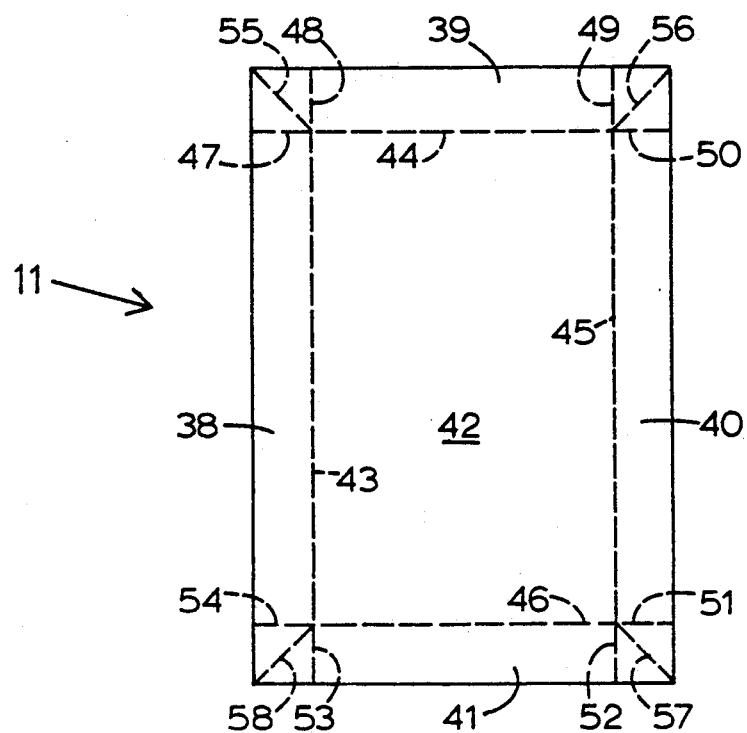
FIG. 2 is a top plan view of the parent sheet paperboard from which the inner tray is folded and formed and which will contain the litter material.

The inner tray 11, is manufactured from a flat sheet paperboard in the configuration shown in FIG. 2. All solid lines shown in FIG. 2, represent the edges of the flat paperboard parent sheet, and all dashed lines in FIG. 2, represent scored fold lines. To form the inner tray from the parent sheet as shown in FIG. 2, sides 38, 39, 40, and 41 are folded ninety (90) degrees up from bottom piece 42, along scored fold lines 43, 44, 45, and 46 respectively. The four (4) corners of tray 11, are formed by folding each pair of scored fold lines, 47 and 48, 49 and 50, 51 and 52, and 53 and 54, such that each pair of scored fold lines are touching and vertically oriented, where they are adhesively fastened together, and the diagonal score lines 55, 56, 57, and 58 at each corner are directed toward the inside center of the tray. The diagonal folds along lines 55, 56, 57, and 58, are then folded over against the respective inside surfaces of the tray sides 38, 39, 40, and 41, and adhesively fastened thereto. The resulting corner construction as well as the strength and finish of the material shall be such that tray 11, when constructed will be strong enough to contain the weight of moist litter material and resist moisture leakage.

FIG. 3

Figure 3:
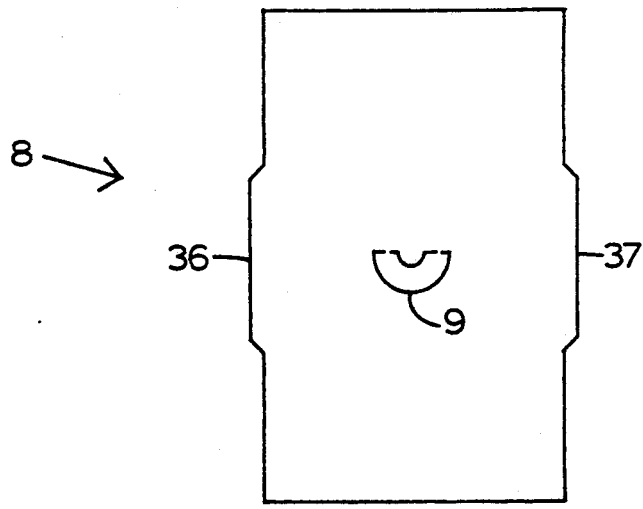
FIG. 3 is a top plan view of the parent sheet paperboard diaphragm from which its handle is folded and formed.
Figure 5:
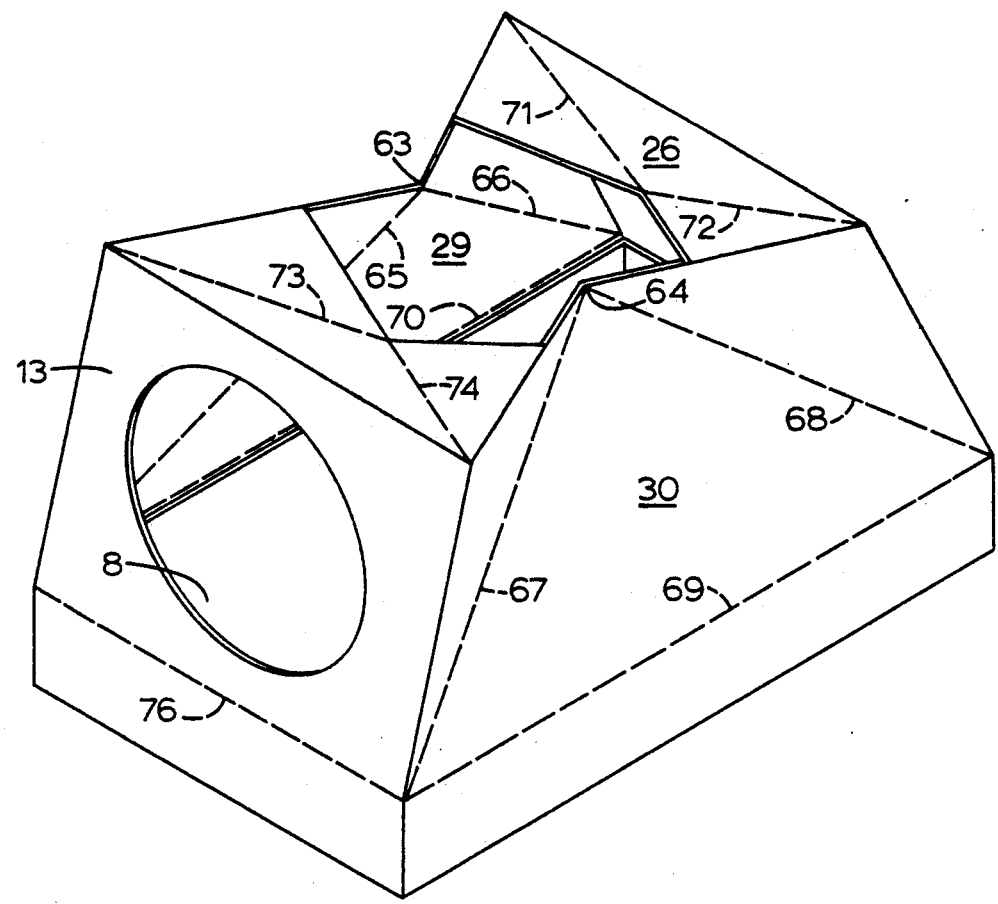
FIG. 5 is a perspective view of the invention as shown in FIG. 1, showing the invention in a partially erected state during conversion from the pre-use state to the erected for use state, or from the erected for use state to the post-use state.
Figure 6:
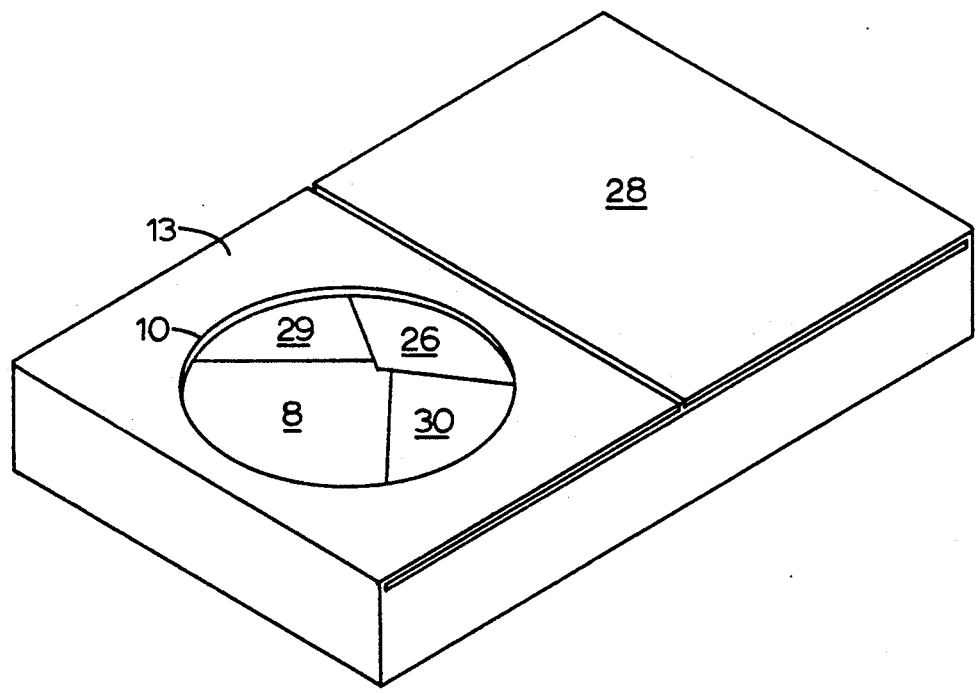
FIG. 6 is a perspective view of the invention folded down in the pre-use packaging state and the post-use disposal state.

The diaphragm 8, is manufactured from a flat sheet paperboard in the configuration shown in FIG. 3, and works in concert with the outer box 7, as shown in FIG. 1. The diaphragm 8, is a stiff, flat, rectangular, disconnected piece, which is relocated as an element of the procedure required to transform the outer box 7 from the compact pre-use storage/post-use disposal state, as shown in FIG. 6, to a larger rectangular box chamber as shown in FIG. 1. That is, when tab 36 and tab 37 of diaphragm 8, as shown in FIG. 3, are pulled through opening 27, in top 26, of outer box 7, as shown in FIG. 1, and FIG. 5, diaphragm 8, structurally supports the outer box, in the erected state, as shown in FIG. 1. Diaphragm 8, may alternately be disengaged from the inside top of outer box 7, as shown in FIG. 1, and moved back down to a position over the inner tray 11, shown in FIG. 5, allowing the outer box to be folded down, transforming the invention to the pre-use storage/post-use disposal state, shown in the following FIG. 6.

FIG. 4

Figure 4:
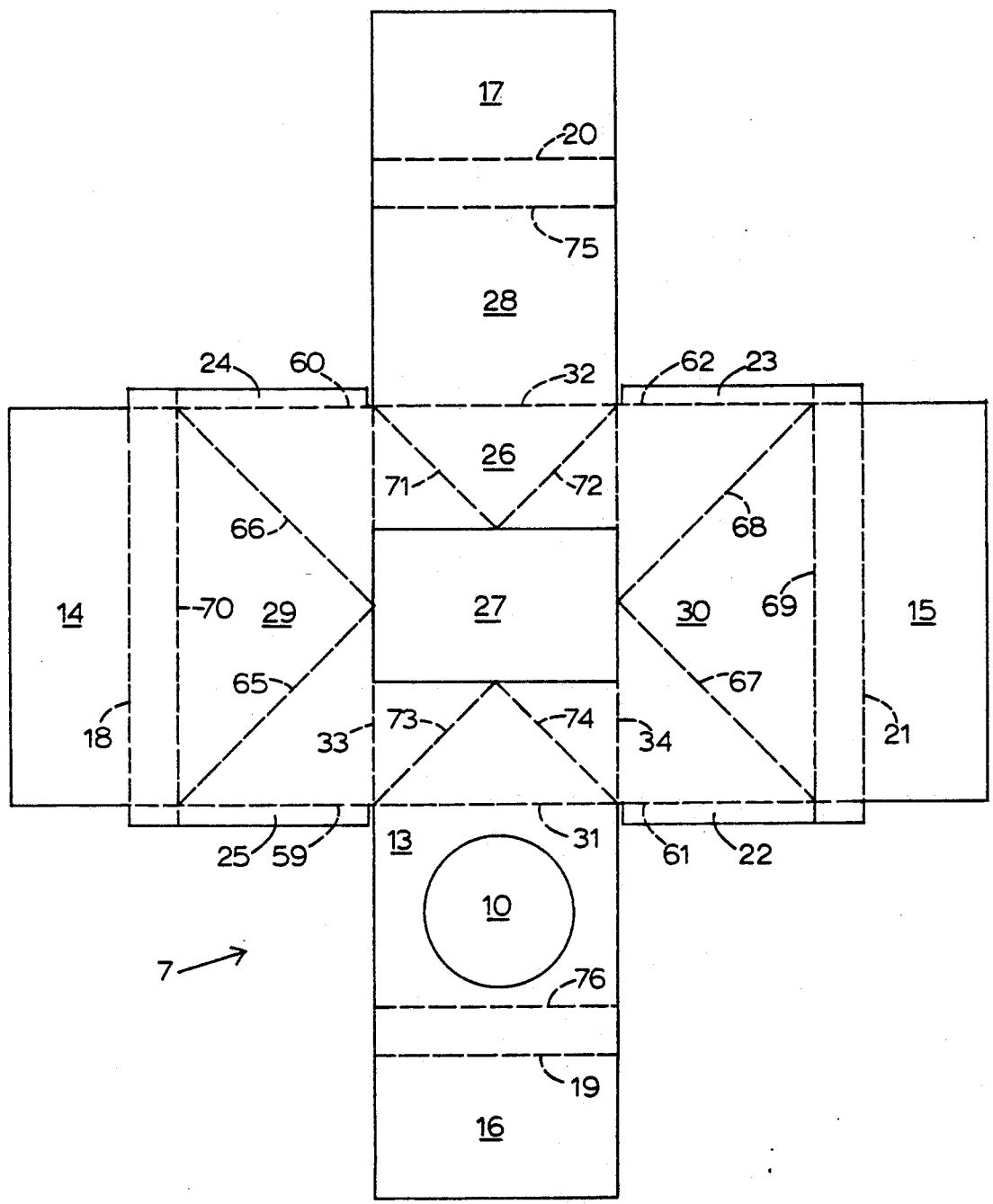
FIG. 4 is a top plan view of the parent sheet paperboard from which the outer box shown in FIG. 1 is folded and formed.

The outer box 7, is manufactured from a flat sheet paperboard in the configuration shown in FIG. 4, at which time the circular hole 10, and the rectangular hole 27 are created. All solid lines shown in FIG. 4, represent the edges of the flat sheet paperboard piece. All dashed lines shown in FIG. 4, represent scored fold lines. To form the outer box 7, from the flat sheet paperboard shown in FIG. 4, the front 13, back 28, side 29, and side 30 are folded down ninety (90) degrees from the top 26, along scored fold lines 31, 32, 33, and 34, respectively. The four vertical corners between sides 29, and 30, and front 13, and back 28, are typically constructed by folding tabs 25 and 24, 23 and 22, along scored fold lines 59 and 60, 61 and 62, respectively, ninety (90) degrees from the corresponding sides 29 and 30, and lapped and adhesively fastened to the inside surface of the adjacent front 13, and back 28. When assembling a complete unit, the inner tray 11, partially filled with absorbent granular litter material, and diaphragm 8, positioned over the open top of the litter filled tray, are at this point placed inside outer box 7. The bottom of outer box 7, is formed by first folding under bottom pieces 16 and 17, along scored fold lines 19 and 20, respectively, ninety (90) degrees from front 13, and back 28, respectively. Bottom pieces 14 and 15, are then folded along scored fold lines 18 and 21, respectively, ninety (90) degrees from sides 29 and 30, respectively, and lapped and adhesively fastened to bottom pieces 16 and 17, as common to the art of cardboard packing box making. Scored fold lines 65, 66, and 70 on side 29, scored fold lines 67, 68, and 69, on side 30, scored fold lines 71, 72, 73, and 74, on top 26, scored fold line 75, on back 28, and scored fold line 76, on front 13, all facilitate the transformation of the outer box 7, as shown in FIG. 5, from the erected state as described here above, and as shown in FIG. 1, to the pre-use storage/post-use disposal state, as shown in the following FIG. 6.

FIG. 5

This view shows the partially erected state of the invention and the intended operable fold lines of the outer box. To fold down the outer box, diaphragm 8, is disengaged from the outer box and lowered to a position just over the inner tray, as shown in FIG. 5, allowing side 29, and side 30 to be folded down along scored fold lines 65 and 66, and 67 and 68 respectively. Points 63 and 64, as shown in FIG. 5, are moved toward the center of the box hinging along scored fold lines 70 and 69, respectively, such that the portions of sides 29 and 30, that were above scored fold lines 70 and 69, respectively, are folded into the center of the container and the portions of sides 29 and 30, below scored fold lines 70 and 69, respectively, remain in the original planes of sides 29 and 30, as shown in FIG. 1, and thus, become the sides of the disposable box container in the pre-use and post-use state, as shown in FIG. 6. The top 26, of the outer box 7, folds down in a similar fashion along scored fold lines 71, 72, 73, and 74, as the points 63 and 64, are moved together. As the opposing points 63 and 64, come together in the middle of the box, point 63 or 64 is tucked under the adjacent point 63 or 64, which allows the box to continue collapsing, drawing front 13, and back 28, down, hinging along scored fold lines 76 and 75, respectively, until the portions of front 13, and back 28, that were above scored fold lines 76 and 75, respectively, have been folded into a horizontal plane, becoming the top of the disposable box container in the pre-use and post-use state, as shown in FIG. 6. Now the portions of front 13, and back 28, below scored fold lines 76 and 75, respectively, remain in the original planes of front 13, and back 28, and thus, become the sides of the disposable box container as shown in FIG. 6.

FIG. 6

This view shows the invention folded completely down in the compact pre-use storage/disposal state. Front 13, and back 28, of outer box 7, as shown in FIG. 6, are folded flat and horizontal. In this position circular opening 10, reveals folded triangular portions of top 26, side 29, and side 30, as well as a portion of diaphragm 8.

Thus a novel easily usable and disposable container provides a clean, efficient method for dealing with pet animal excrement in the household, pet boarding facility and animal clinic.

I claim:

1. A disposable box container of novel construction and operation comprised of:
   (a) a shallow sheet paperboard inner tray which comprises a substantially rectangular plan view with a bottom, four narrow adjacent integral sides with four integral vertical corners, and is open at the top;
   (b) a rectangular sheet paperboard outer box, which has a bottom, an adjacent integral front with a circular opening, a solid adjacent integral back, two solid adjacent integral sides with unique scored folds, four integral vertical corners, an adjacent integral top with unique scored folds and a rectangular opening, into which a structurally stabilizing independent diaphragm piece engages, and which contains the shallow tray tightly at the bottom of the outer box, and which converts by folding, from a position folded down tightly around the inner tray and substantially the same size as the inner tray, to an alternate position, unfolded up to create an interior volume approximately five times as tall as the inner tray, and at the same time positioning a circular opening in the front so as to allow access to the interior volume by a cat;
   (c) an independent, free moving, flat, rectangular, sheet paperboard diaphragm, which is contained inside the outer box, occupying substantially two functional positions, the first, engaged at the inside top of the outer box, where it works in concert with the unique scored folds in the outer box to maintain the outer box in a permanent, stable, expanded state, for the duration of its useful capacity, and the second, over the open top of the inner tray, allowing the outer box to be folded down to substantially the same size as the inner tray.

2. A disposable litter box comprising:
   (a) a material container having a bottom and sides for holding litter material, which container is fluid resistant on the bottom and sides,
   (b) an outer covering container having a plurality of foldable sides which are integral with said sides of said material container that form a substantially open top, said foldable sides are formed to assume a normally collapsed position and are foldable to an alternate raised position around the above said material container, said covering container when in the raised position defining an opening providing access to an interior space of said material container,
   (c) a planar diaphragm means for maintaining said foldable sides in said alternate raised position and is removably positioned in said substantially open top.

3. A disposable litter box as claimed in claim 2, wherein said planar diaphragm means is positioned beneath said foldable sides when in said collapsed position.

* * * * *